United States Patent
Mortensen et al.

(10) Patent No.: US 10,650,131 B1
(45) Date of Patent: *May 12, 2020

(54) EFFICIENT LOGON

(71) Applicant: United Services Automobile Association (USAA), San Antonio, TX (US)

(72) Inventors: Maland Keith Mortensen, San Antonio, TX (US); Thomas Bret Buckingham, Fair Oaks Ranch, TX (US); Gabriel Carlos Fernandez, San Antonio, TX (US); Debra Randall Casillas, Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/402,079

(22) Filed: May 2, 2019

Related U.S. Application Data

(63) Continuation of application No. 15/993,464, filed on May 30, 2018, now Pat. No. 10,325,085, which is a continuation of application No. 15/241,182, filed on Aug. 19, 2016, now Pat. No. 10,013,544, which is a continuation of application No. 13/874,289, filed on Apr. 30, 2013, now Pat. No. 9,430,624.

(51) Int. Cl.
| | |
|---|---|
| *G06F 21/35* | (2013.01) |
| *G06F 21/40* | (2013.01) |
| *G06F 21/31* | (2013.01) |
| *G06F 21/32* | (2013.01) |

(52) U.S. Cl.
CPC ............ *G06F 21/35* (2013.01); *G06F 21/316* (2013.01); *G06F 21/32* (2013.01); *G06F 21/40* (2013.01)

(58) Field of Classification Search
CPC .......... G06F 21/35; G06F 21/32; G06F 21/40; G06F 21/316
See application file for complete search history.

(56) References Cited

U.S. PATENT DOCUMENTS

| | | | | |
|---|---|---|---|---|
| 5,131,038 A | * | 7/1992 | Puhl ........................ | G06F 21/35 340/5.61 |
| 5,202,929 A | * | 4/1993 | Lemelson ............... | G06F 21/32 340/5.74 |
| 6,070,240 A | * | 5/2000 | Xydis ..................... | G06F 21/35 726/17 |
| 6,189,105 B1 | * | 2/2001 | Lopes ..................... | G06F 21/35 726/20 |

(Continued)

OTHER PUBLICATIONS

U.S. Appl. No. 13/874,289, filed Apr. 30, 2013, Efficient Logon.

(Continued)

*Primary Examiner* — J. Brant Murphy
(74) *Attorney, Agent, or Firm* — Perkins Coie LLP

(57) ABSTRACT

The technology described herein detects a first device associated with a user that is within a detectable range of a second device. The system requests authentication information. In response to receiving the authentication information, a token generator associated with the user can generate a secure token. The secure token can be sent to the server. Once the secure token is verified, the user is granted access to one or more services.

18 Claims, 6 Drawing Sheets

(56) References Cited

U.S. PATENT DOCUMENTS

| | | | | |
|---|---|---|---|---|
| 6,209,091 B1* | 3/2001 | Sudia | G06F 21/40 | 705/76 |
| 6,774,796 B2* | 8/2004 | Smith | G06F 21/35 | 340/573.1 |
| 7,797,537 B2* | 9/2010 | Kurita | H04L 9/0844 | 235/375 |
| 7,873,364 B2* | 1/2011 | Park | H04W 24/00 | 455/405 |
| 8,223,012 B1* | 7/2012 | Diem | G06Q 10/00 | 340/539.13 |
| 8,302,152 B1* | 10/2012 | Hewinson | G06F 16/29 | 726/1 |
| 8,467,770 B1* | 6/2013 | Ben Ayed | H04L 63/107 | 455/411 |
| 8,494,576 B1* | 7/2013 | Bye | G07C 9/00087 | 455/550.1 |
| 8,739,264 B1* | 5/2014 | Eddings | G06F 21/35 | 726/10 |
| 8,866,586 B2 | 10/2014 | Hayashi | | |
| 9,122,866 B1* | 9/2015 | Kolman | G06F 21/46 | |
| 9,240,886 B1* | 1/2016 | Allen | H04L 9/32 | |
| 2004/0054711 A1* | 3/2004 | Multer | H04L 67/1095 | 709/201 |
| 2004/0054783 A1* | 3/2004 | Takemura | H04N 5/765 | 709/227 |
| 2004/0117662 A1* | 6/2004 | Ong | G06F 21/31 | 726/5 |
| 2004/0230809 A1* | 11/2004 | Lowensohn | G06F 21/35 | 713/186 |
| 2004/0232220 A1* | 11/2004 | Beenau | G01D 21/00 | 235/380 |
| 2004/0257202 A1* | 12/2004 | Coughlin | G06F 21/35 | 340/5.82 |
| 2005/0272420 A1 | 12/2005 | Matsuda et al. | | |
| 2005/0278776 A1* | 12/2005 | Kitagawa | G06F 21/35 | 726/3 |
| 2006/0005035 A1* | 1/2006 | Coughlin | G06F 21/35 | 713/182 |
| 2006/0075019 A1* | 4/2006 | Donovan | G06Q 30/02 | 709/203 |
| 2006/0271788 A1* | 11/2006 | Chang | H04L 63/0853 | 713/182 |
| 2006/0294388 A1* | 12/2006 | Abraham | G06F 21/305 | 713/182 |
| 2007/0094374 A1* | 4/2007 | Karia | H04L 29/06027 | 709/223 |
| 2007/0155398 A1* | 7/2007 | Park | H04W 24/00 | 455/453 |
| 2008/0072064 A1* | 3/2008 | Franchi | G06F 21/32 | 713/186 |
| 2008/0086770 A1* | 4/2008 | Kulkarni | H04L 63/0876 | 726/20 |
| 2008/0109895 A1* | 5/2008 | Janevski | G06F 21/35 | 726/19 |
| 2009/0037983 A1* | 2/2009 | Chiruvolu | G06F 21/31 | 726/4 |
| 2009/0117889 A1* | 5/2009 | Varanda | G06F 9/4418 | 455/418 |
| 2009/0147772 A1* | 6/2009 | Rao | H04L 12/1818 | 370/352 |
| 2009/0164772 A1* | 6/2009 | Karkaria | G06F 9/445 | 713/100 |
| 2009/0181653 A1* | 7/2009 | Alharayeri | H04L 67/16 | 455/414.1 |
| 2009/0205030 A1* | 8/2009 | Ong | G06F 21/34 | 726/6 |
| 2009/0264070 A1* | 10/2009 | Lim | G06Q 30/0261 | 455/41.2 |
| 2009/0300168 A1* | 12/2009 | Guo | G06F 21/73 | 709/224 |
| 2010/0138908 A1* | 6/2010 | Vennelakanti | G06F 21/33 | 726/11 |
| 2010/0203875 A1* | 8/2010 | Nishimori | H04W 76/45 | 455/416 |
| 2010/0250944 A1* | 9/2010 | Suzuki | G06F 21/32 | 713/172 |
| 2011/0070825 A1* | 3/2011 | Griffin | H04B 5/0031 | 455/41.1 |
| 2011/0070837 A1* | 3/2011 | Griffin | H04B 5/0062 | 455/41.3 |
| 2011/0083017 A1* | 4/2011 | Ali | G06F 21/34 | 713/185 |
| 2011/0084807 A1* | 4/2011 | Logan | H04Q 9/00 | 340/10.1 |
| 2011/0215921 A1* | 9/2011 | Ben Ayed | H04B 7/00 | 340/539.11 |
| 2011/0239278 A1* | 9/2011 | Downey | H04L 63/083 | 726/4 |
| 2011/0241872 A1* | 10/2011 | Mahaffey | H04L 41/026 | 340/539.13 |
| 2011/0270680 A1* | 11/2011 | Lim | G06Q 30/0261 | 705/14.58 |
| 2012/0069131 A1 | 3/2012 | Abelow | | |
| 2012/0135683 A1* | 5/2012 | Lee | H04L 63/101 | 455/41.2 |
| 2012/0197806 A1* | 8/2012 | Hill | G06F 21/35 | 705/67 |
| 2012/0216292 A1* | 8/2012 | Richardson | H04W 12/12 | 726/27 |
| 2012/0256725 A1* | 10/2012 | Hayashi | G06F 21/32 | 340/5.81 |
| 2012/0284649 A1* | 11/2012 | Levy | G06Q 50/01 | 715/753 |
| 2013/0055346 A1* | 2/2013 | Singh | G06F 21/34 | 726/3 |
| 2013/0090140 A1* | 4/2013 | Morisaki | G06Q 10/06 | 455/466 |
| 2013/0109307 A1* | 5/2013 | Reisgies | H04L 63/08 | 455/41.1 |
| 2013/0169434 A1* | 7/2013 | McCown | G08B 21/00 | 340/540 |
| 2013/0212674 A1* | 8/2013 | Boger | G06F 21/36 | 726/17 |
| 2013/0219454 A1 | 8/2013 | Hewinson | | |
| 2013/0219473 A1* | 8/2013 | Schaefer | G06F 21/335 | 726/4 |
| 2013/0238540 A1* | 9/2013 | O'Donoghue | G06Q 99/00 | 706/46 |
| 2013/0263211 A1* | 10/2013 | Neuman | H04L 63/08 | 726/1 |
| 2013/0282589 A1* | 10/2013 | Shoup | G06F 21/34 | 705/67 |
| 2014/0181942 A1* | 6/2014 | Zhou | G06F 21/31 | 726/7 |
| 2014/0189808 A1* | 7/2014 | Mahaffey | H04L 63/083 | 726/4 |
| 2014/0215602 A1* | 7/2014 | Chuaprasort | G06Q 30/02 | 726/20 |
| 2014/0282963 A1* | 9/2014 | Wildermuth | H04L 63/08 | 726/7 |
| 2014/0344446 A1* | 11/2014 | Rjeili | H04L 43/04 | 709/224 |
| 2015/0040212 A1* | 2/2015 | Kim | G06F 21/32 | 726/19 |
| 2015/0046996 A1 | 2/2015 | Slaby et al. | | |
| 2015/0096352 A1* | 4/2015 | Peterson | F24F 11/30 | 73/31.02 |
| 2015/0172275 A1* | 6/2015 | Milya | H04L 63/0846 | 726/6 |
| 2016/0104154 A1* | 4/2016 | Milov | G06Q 20/4012 | 705/67 |

OTHER PUBLICATIONS

U.S. Appl. No. 15/241,182, filed Aug. 19, 2016, Efficient Logon.
U.S. Appl. No. 14/630,038, filed Feb. 24, 2014, Efficient Startup and Logon.

(56) References Cited

OTHER PUBLICATIONS

U.S. Appl. No. 15/993,464, filed May 30, 2018, Efficient Logon.
U.S. Appl. No. 15/918,997, filed Mar. 12, 2018, Efficient Startup and Logon.
U.S. Appl. No. 15/359,089, filed Nov. 22, 2016, Efficient Startup and Logon.
U.S. Appl. No. 14/630,038, filed Feb. 24, 2015, Efficient Startup and Logon.

* cited by examiner

EFFICIENT LOGON

CROSS-REFERENCE TO RELATED APPLICATIONS

This application is a continuation of U.S. application Ser. No. 15/993,464, filed on May 30, 2018, entitled "EFFICIENT LOGON", now allowed, which is a continuation of U.S. application Ser. No. 15/241,182, filed on Aug. 19, 2016, entitled "EFFICIENT LOGON," issued as U.S. Pat. No. 10,013,544 on Jul. 3, 2018, which is a continuation of and claims priority to U.S. application Ser. No. 13/874,289, filed on Apr. 30, 2013, entitled "EFFICIENT LOGON," issued as U.S. Pat. No. 9,430,624 on Aug. 30, 2016, each of which are hereby incorporated by reference in their entireties for all purposes. This application is related to U.S. application Ser. No. 14/630,038, filed on Feb. 24, 2015, entitled "EFFICIENT STARTUP AND LOGON", U.S. application Ser. No. 15/359,089, filed on Nov. 22, 2016 entitled "EFFICIENT STARTUP AND LOGON", and U.S. application Ser. No. 15/918,997, filed on Mar. 12, 2018, "entitled EFFICIENT STARTUP AND LOGON."

TECHNICAL FIELD

Various embodiments of the disclosure generally relate to authentication. More specifically, some embodiments of the disclosure relate to efficient logon systems and methods.

BACKGROUND

In the area of computer security, a login or logon refers to credentials necessary to obtain access to a computer system, enterprise service (e.g., e-mail, data management systems, etc.), or other restricted area. Logging in or on is the process by which individual access to a computer system is controlled by identifying and authenticating the user through the credentials presented by the user. In many cases, the user supplies a username and a password. Depending on the level of security to the restricted area, the user may be asked to provide additional information such as a birthdate.

Once a user has logged in, the user can log off when the user no longer required access to the system. Each time a user returns, a subsequent log in may be necessary.

BRIEF DESCRIPTION OF THE DRAWINGS

Embodiments of the present disclosure will be described and explained through the use of the accompanying drawings in which.

Figure 1:
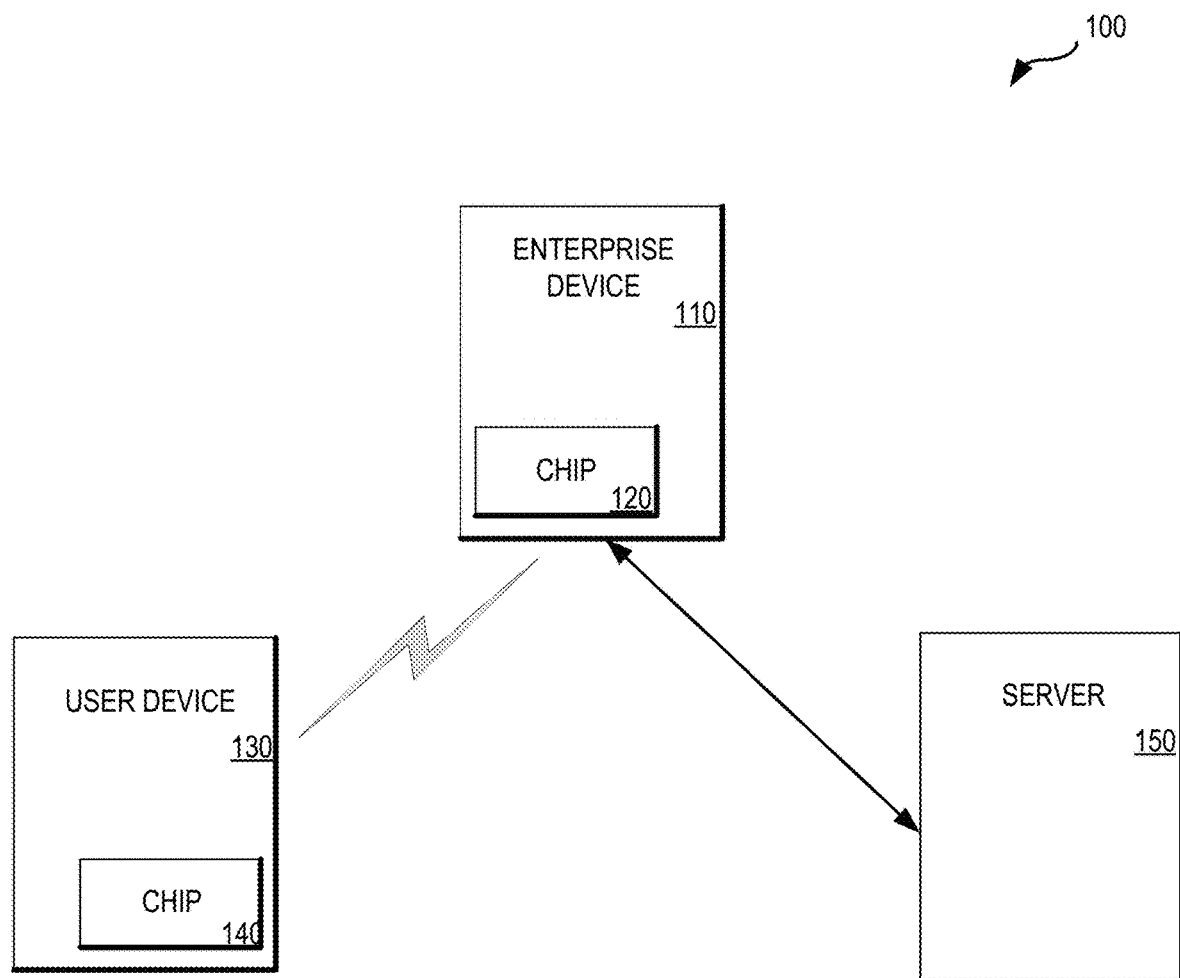
FIG. 1 illustrates an example of an environment in which some embodiments of the disclosure may be utilized.

The drawings have not necessarily been drawn to scale. For example, the dimensions of some of the elements in the figures may be expanded or reduced to help improve the understanding of the embodiments of the present disclosure. Similarly, some components and/or operations may be separated into different blocks or combined into a single block for the purposes of discussion of some of the embodiments of the present disclosure. Moreover, while the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

Various embodiments of the disclosure generally relate to authentication. More specifically, some embodiments of the disclosure relate to efficient logon systems and methods. Historically, to logon to a system, enterprise service (e.g., e-mail, data management system, etc.), or other restricted website or device with a user account, such as an employee logging onto an enterprise computer system or a member of a membership organization logging onto the member's account in the membership organization system, the user types in a username and a password. After verifying that the username and password match with previous recorded information, the user is authenticated and logged onto the system.

The username/password process can be cumbersome, so much so that users sometimes fail to logoff or lock their computers while away from their computers, leaving the computer, system, and user account vulnerable to misuse by others. As a result, many companies automatically lock a computer and/or logoff the user after a period of inactivity to prevent unauthorized access.

In contrast, some embodiments of the present disclosure include an efficient logon system that uses radio frequency identification ("RFID"), near-field communications ("NFC"), Bluetooth, or other short-range communications to detect that a user device is near an enterprise device (e.g., a computer, laptop, etc.), request additional authentication from the user and/or user device if desired, and log the user onto a computer system or other restricted area. In some embodiments, the user may provide information to validate the user (e.g., password), and the user device may provide information to validate the user device (e.g., digital certificate) prior to the user being logged on to the system. The requested information for authentication may include a personal identification number ("PIN") or biometric information. Biometric information may include voice, fingerprint, retinal scan, behavioral biometrics (e.g., time between keystrokes, the intensity of the keystrokes, etc.). A quick-logon process (e.g., using a token and/or token generator, Public-Key Infrastructure ("PKI") certificate or other digital certificate, or device fingerprint for user authentication, etc.) may be used in conjunction with the PIN, password, or biometric information.

In addition, when the user device is out of the detectable range of the enterprise device, the enterprise device may automatically log off the user, or take another action (e.g., lock the computer) depending on the time of day (e.g., lunch time) or other factors. Similarly, the enterprise device may be able to access a user's calendar to determine the appropriate action that should be taken. For example, if a calendar entry is present that indicates the user is out of the office for the rest of the day, the enterprise device may logoff the computer.

In an example, the user may be an employee approaching his/her workstation at his/her place of employment. The user, having an RFID-enabled badge, proximity device, or other device capable of sending and/or receiving short range communications may walk up to, or within a detectable range of, an enterprise device such as the user's computer workstation. The workstation may be capable of sending and/or receiving short range communications such that the workstation detects that the user is near the workstation. The user may be identified to the workstation based on the signals received by the workstation from the RFID-enabled badge, proximity device, or other user device.

In some embodiments, once the user has been identified, the user may be asked to provide further authentication. For example, the user may be asked for a PIN, password, or other authenticating information which begins a quick-logon process to verify the user, in which case the user's device may provide a PKI certificate or token. In some embodiments, biometrics may be used to verify the user. For example, the user may simply speak and be identified by his/her voice characteristics. Upon being authenticated, the user may automatically be logged onto system, bypassing the username/password phase of typical logon sessions.

The efficient logon process may have uses in additional areas. For example, enterprises may be able to locate employees by virtue of the employee's proximity to their workstation. Employee location may be useful in times of natural disasters such as tornados, wildfires or earthquakes. It may also be useful in locating the employee when an enterprise emergency is ongoing, such as a plant shutdown, or for personal emergencies related to the employee.

While, for convenience, embodiments of the present disclosure are described with reference to workplace environment, embodiments of the present disclosure are equally applicable to various other organizations and/or user accounts with various logon requirements. For example, techniques disclosed herein may be used to logon to various websites, automated transaction machines ("ATM"), point-of-sale ("POS") devices, and other devices or systems requiring authentication. Further, embodiments may also apply to user accounts of membership organizations.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having instructions stored thereon that may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean that the particular feature, structure, or characteristic following the phrase is included in at least one embodiment of the present disclosure, and may be included in more than one embodiment of the present disclosure. In addition, such phrases do not necessarily refer to the same embodiments or to different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

General Description

FIG. 1 illustrates an example of an environment 100 in which some embodiments of the disclosure may be utilized. Environment 100 includes enterprise device 110, enterprise device chip 120, user device 130, user device chip 140, and server 150.

User device 130 may be any device capable of exchanging short-range signals to the enterprise device 110 such as a mobile device, card, tablet, personal device monitor, etc. A personal device monitor may be a health monitor, body chip, or any other device monitor associated with the user. User device 130 may include a chip 140 or other device capable of exchanging short-range signals with enterprise device 110. User device 130 may be capable of providing information to enterprise device 110 to validate itself as a device.

Enterprise device 110 may be any type of device such as a computer, tablet, smartphone, ATM, POS device, etc. In some embodiments, enterprise device 110 is a corporate workstation. In some embodiments, enterprise device 110 may be an ATM, point of sale device, or other point of interaction. Enterprise device 110 may include chip 120, circuitry, active reader tags, passive reader tags, or other element capable of exchanging short-range signals with chip 140, circuitry, or other device associated with user device 130. For example, enterprise device 110 may exchange communication with user device 130 via radio frequency identification (RFID) or Near-Field Communications (NFC). Other short-range protocols and systems can be used in some embodiments. In some embodiments, enterprise device 110 exchanges communication with user device 130 using physical contact between the user device and the enterprise device 110. For example, the user may "bump" the user device and the enterprise device to exchange information using hardware and/or software installed on either or both devices. In some embodiments, a user device 130 may be slid into the enterprise device 110 in a manner similar to a credit card machine in order to exchange data.

Server 150 may exchange communication with enterprise device 110. Server 150 may be an internal or external server and may include information about the user which can be used as part of the efficient login process. For example, enterprise device 110 may request a user profile, PIN, token, token generator, digital certificate, password, etc. from server 150 in authenticating a user. Information collected from the user (e.g., password) to validate the user, and information from the device, to validate the device (e.g., digital certificate) may be collected and validated in the authentication process.

Figure 2:
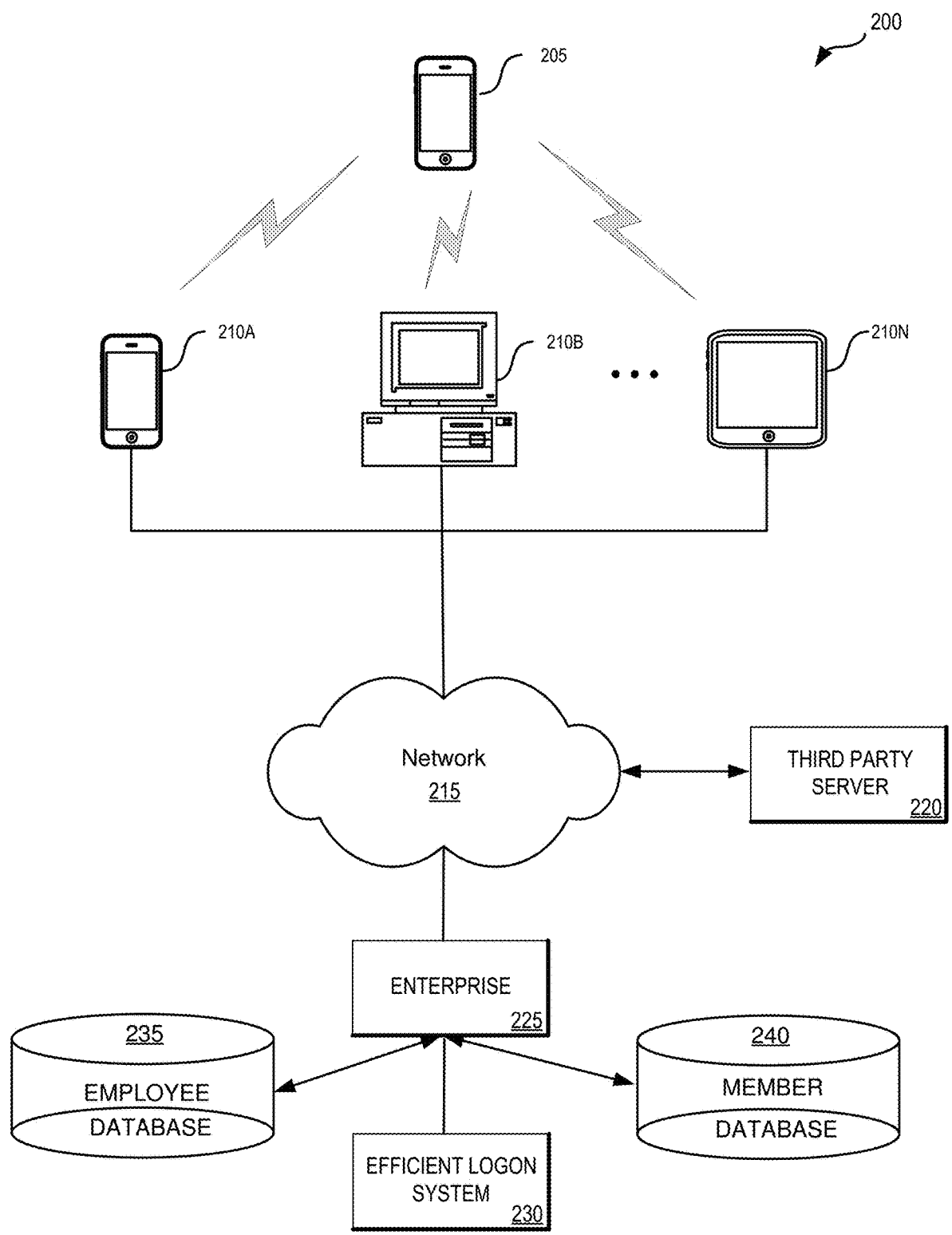
FIG. 2 illustrates an example of a network-based environment in which some embodiments of the disclosure may be utilized.

FIG. 2 illustrates an example of a network-based environment 200 in which some embodiments of the disclosure may be utilized. As illustrated in FIG. 2, network-based operating environment 200 may include points of interaction such as enterprise devices 210A-N (such as a mobile device, a mobile phone, a tablet computer, a mobile media device, a mobile gaming device, a vehicle-based computer, a dedicated terminal, a public terminal, a kiosk, etc.), and user device 205 (e.g., an RFID or NFC enabled card, mobile device, tablet computer, etc.). These points of interaction can include mechanisms for providing efficient logon capabilities by connecting through network 215 to enterprise 225. For example, enterprise devices 210A-N may run one or more applications or clients that allow a user to interact with the network 215. Such applications may provide access to an efficient logon system 230, employee database 235, and member database 240.

In addition, enterprise devices 210A-N can include network communication components that enable the points of interaction to communicate with network 215 or other electronic devices by transmitting and receiving wireless signals using licensed, semi-licensed or unlicensed spectrum over network 215. In some cases, network 215 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. Network 215 can also include third-party communication networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network, or other communications network.

As illustrated in FIG. 2, enterprise 225 can be communicably coupled to one or more databases such as employee database 235 and member database 240. These databases can have a variety of information that can be utilized by an efficient logon system. For example, employee database 235 can include employee information such as user profiles, passwords, token generators or serial numbers, usernames, PINs, etc. Member database 240 may include similar information for members of enterprise 225, as well as additional information pertaining to members. In some embodiments, these two databases can be integrated into one database. A computer system associated with enterprise 225 may be able to access these (and other) databases for account information, employee/member information, and other stored information.

Efficient logon system 230 may include components capable of receiving information, such as signals received from user device 205 (or multiple user devices) into enterprise devices 210A-N, determining an identity of the user device based on the signals, requesting and receiving additional information to verify the identity of the user, and validating the user. In some embodiments, additional authentication may be requested of a user upon detecting a signal from user device 205. One advantage of using the additional authentication is to identify which user from a group of users within the vicinity of the device should be logged on.

In other embodiments, additional information such as proximity to the point of interaction (e.g., by a video camera, signal strength, etc.), length of time near a point of interaction, prior use history, relative user locations, voice recognition, and other factors can be used to automatically anticipate which user should be logged on. In an example, the user device or user detected by signal strength or by video camera to the be the closest user or user device in proximity to the enterprise device may be selected from the plurality of users or user devices detected. In an additional example, a user's voice may be detected, and the user may be selected based on the user's voice. In some embodiments, the user's voice not only provides a means for selection, but also provides authenticating information to the enterprise device. Accordingly, in some embodiments, the enterprise device identifies the user separately from the user device (or in combination) to initiate the efficient logon process.

In a further example, if two user devices are detected by an enterprise device and one of the user profiles associated with one of the user devices indicates that the enterprise device is the primary enterprise device (e.g., a computer in the user's office) associated with that user device, then that user device may automatically be assumed to be the user logging into the system. In some embodiments, when more than one user device is detected, a list of the users or user devices may be listed on the enterprise device and the user may select which user or user device should be logged on. Still yet, in some embodiments, when only one user is present, the system may request additional authentication.

Third party server 220 may be communicably coupled to network 215 and may interact with efficient logon system 230 in validating the user. For example, third party server 220 may provide or verify tokens used during the logon process.

Figure 3:
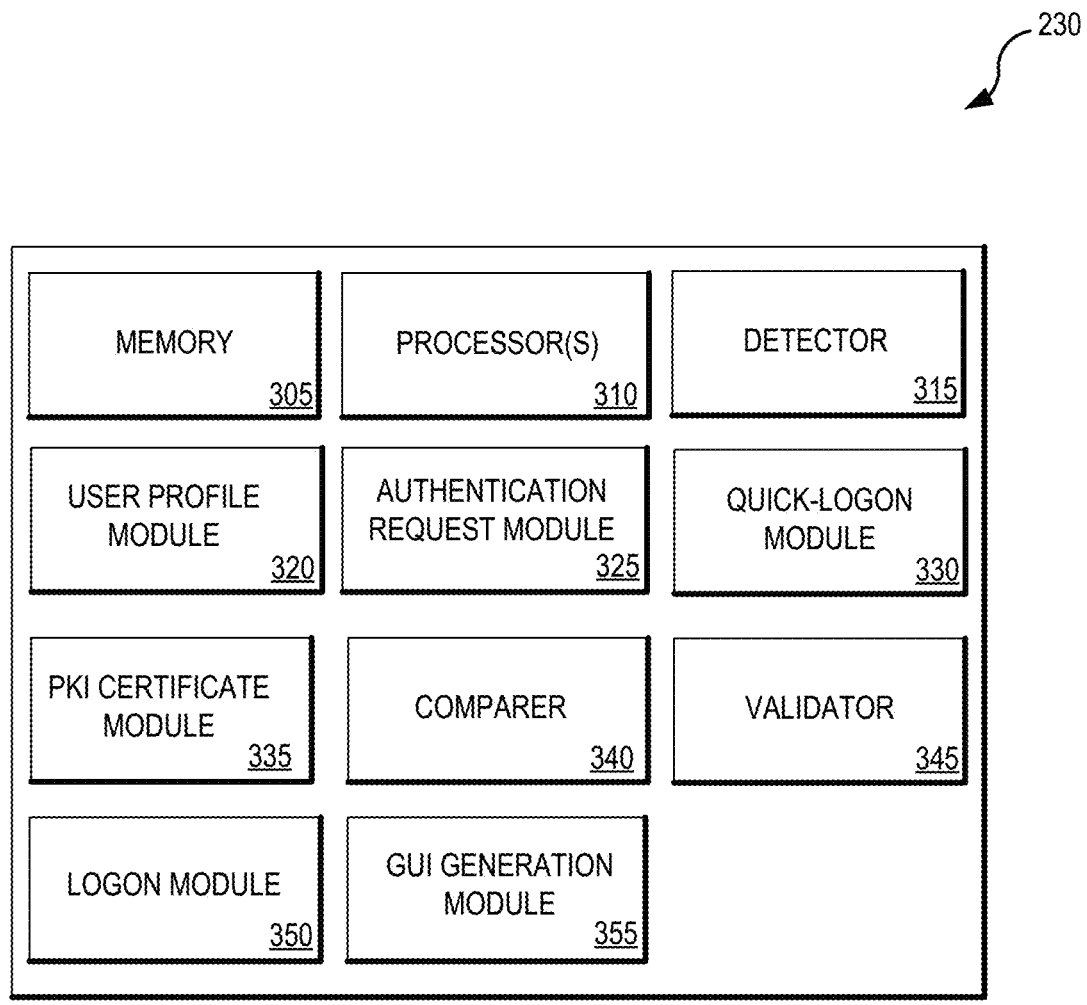
FIG. 3 illustrates components of an efficient logon system in accordance with one or more embodiments of the disclosure.

FIG. 3 illustrates components of efficient logon system 230 in accordance with one or more embodiments of the present disclosure. According to the embodiments shown in FIG. 3, efficient logon system 230 can include memory 305, one or more processors 310, detector 315, user profile module 320, authentication request module 325, quick-logon module 330, PKI certificate module 335, comparer 340, validator 345, logon module 350, and graphical user interface (GUI) generation module 355. Other embodiments of the present disclosure may include some, all, or none of these modules and components along with other modules, applications, and/or components. Further, some embodiments may incorporate two or more of these modules and components into a single module, and/or associate a portion of the functionality of one or more of these modules with a different module. For example, in one embodiment, validator 345 and logon module 350 can be combined into a single module for validating and logging users onto the system.

Memory 305 can be any device, mechanism, or populated data structure used for storing information. In accordance with some embodiments of the present disclosure, memory 305 can encompass any type of, but is not limited to, volatile memory, nonvolatile memory and dynamic memory. For example, memory 305 can be random access memory, memory storage devices, optical memory devices, magnetic media, floppy disks, magnetic tapes, hard drives, SDRAM, RDRAM, DDR RAM, erasable programmable read-only memories (EPROMs), electrically erasable programmable read-only memories (EEPROMs), compact disks, DVDs, and/or the like. In accordance with some embodiments, memory 305 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 305.

Memory 305 may be used to store instructions for running one or more applications or modules on processor(s) 310. For example, memory 305 could be used in one or more embodiments to house all or some of the instructions needed to execute the functionality of detector 315, user profile module 320, authentication request module 325, quick-logon module 330, PKI certificate module 335, comparer 340, validator 345, logon module 350, and GUI generation module 355.

Detector 315 can be configured to detect and/or receive signals when a user device such as user device 205 is within a detectable radius or distance of detector 315. The radius or distance may be centimeters or a much larger distance depending on the type of detector and the technology or protocol used. In some embodiments, more than one user device may be detected at one time and further actions may be taken to determine which user is attempting to logon. Detector 315 may be a chip having identity protection technology (e.g., an IPT chip made by Intel®). Detector 315 may be integrated with an enterprise device 210A-N or personal computer. The signals may be near-field communications, Bluetooth protocol, ZigBee, or any other types of signals used within a personal area network. In some embodiments, the user device may be detected by physical contact such as by physically contacting a user device and the enterprise device (e.g., bumping). The signal may contain information (e.g., a unique identifier) that can be provided to user profile module 320 to determine an initial identity of the user device 205. The signals may provide additional authenticating information such as a PKI certificate or a token generated from a token generator associated with the user device.

User profile module 320 can be configured to receive information from detector 315 and access a user profile for the user based on the information. User profiles may include information relating to the user such as the user's accesses, a level of authentication, user preferences, the type of information required for the user to be authenticated, identifying information such as voice biometrics, fingerprints, PINs, answers to security questions, employee or member identification numbers, and other information. User profile module 320 may provide user profile information to authentication request module 325.

Authentication request module 325 may receive information relating to the user from user profile module 320 and request additional information from the user to authenticate the user. The type of information may depend on the security level associated with the user. In some embodiments, the user will be requested to provide a PIN, password, or other authenticating information, which may begin a quick-logon process using a token and/or token generator initiated by quick-logon module 330, or the PIN may begin used to initiate a quick-logon process using a PKI digital certification by PKI certificate module 335. In some embodiments, the token, token generator, and PKI certificate can be used in combination. In other embodiments, authentication request module 325 may request identifying information which is compared with previously provided information by comparer 340.

Quick-logon module 330 can be configured to receive a PIN or other identifier from a user and initiate a process to authenticate the user. Several methods for quick-logon may be used. In some examples, a token generator and a secret shared key are used; in other examples, a token generator is not used. In some embodiments, the quick-logon process uses a PKI certificate to authenticate the user.

Quick-Logon Installation Process Example

In some embodiments, as part of the efficient logon process, various quick-logon techniques and components may be installed using several steps. For example, in some embodiments, a user may be asked if the user desires to install quick-logon to reduce the amount of time and effort it takes the user to logon. Quick-logon may be installed on an enterprise device and used to log a user onto an enterprise system, or quick-logon may be installed on a personal computer to log a user onto a user account via a web browser.

The quick-logon installation process may begin by collecting information to create a device fingerprint, or collecting the actual device fingerprint of the enterprise device. A device fingerprint of the device may be created by running software on the device or installing an application. This information or the device fingerprint may be stored at the enterprise.

The device fingerprint may be associated with the user in the enterprise server using identifying information provided by the user prior to quick-logon installation or at the time of the installation. A newly-created or pre-existing user identification/member identification number may be used to associate the user with the device fingerprint. Although the device fingerprint may not be completely unique to the device, it can be used as one identifying factor when authenticating the user. The device fingerprint provides assurance, at least to a certain threshold, that the enterprise server can recognize when portions of the system are compromised and access is attempted from a different device.

In some embodiments, such as where the user logs into a user account via a web browser, a secure browsing solution may be installed on the device with a client-side executable.

Next, during installation, a token generator is associated with the user, and a shared secret key associated with the token generator may be embedded and installed on the device. Each token generator can have an activation code, a serial number, and a shared secret key associated with it.

In some examples, the enterprise server requests an activation code for the token generator from a third party, such as from third party server 220. The third party provides the activation code for the token generator to the enterprise server. The enterprise server then provides the activation code to the device. Upon receiving the activation code, the device provides the activation code to the third party and requests the shared secret key and the serial number for the token generator. The third party receives the activation code from the device and returns the shared secret key and serial number associated with the token generator to the enterprise device. The enterprise server associates the token generator serial number with the user, such as by associating the serial number with a user identification number.

In some embodiments, during the quick-logon process, the shared secret key, in combination with a time stamp, is provided to the token generator upon logon to generate a one-time code. The one-time code is time-sensitive, meaning that the code provided by the token generator is different depending on the time stamp that the token generator has provided. The shared secret key is generally not provided to the enterprise server. During installation, the shared secret key is encrypted and stored on the enterprise device. In some embodiments, the shared secret key is encrypted with information including, but not limited to, the user's PIN, password or other authenticating information. At this point, registration is complete and the user may be granted access to the account.

In some embodiments, upon completion of registration or upon logout, if the token generator was installed during or after registration, then the token generator can be removed from the device and reinstalled each time the user uses the quick-logon system, providing an extra layer of security. Upon next logon on the device, the quick-logon page may be presented to the user, and the user may be prompted to provide a PIN, password, or other authenticating information to logon.

In some embodiments, the functionality of the token generator may be replaced with or used in addition to a secure or obfuscated key that represents the device. During installation, the enterprise server may install a securely or obfuscated key on the device. This key would be static, unlike the codes that are generated from the token generator. During quick-logon, the key may be verified by the enterprise server. The identifier may be associated on the server side with the user such as with a user identification number. Or the identifier may be associated with the device. Thus, the identifier may be per user or per machine. The key may be stored in any manner on the enterprise device known to those skilled in the art, such as in a secure key ring.

Quick-Logon Use Example

In some embodiments, after installation and during use, the quick-logon process includes only one step for the user—to input a PIN or other simple identifier—but several steps may occur in the background. For example, after the quick-logon is installed on a device, a quick-logon process begins with a request from the enterprise device to access the enterprise server (e.g., after a user device such as a mobile phone or an RFID card has been detected or after a user browses to a certain webpage). The enterprise server collects, analyzes and stores information about the enterprise device. Detecting that the enterprise device has been registered for quick-logon, the user is asked to input a PIN or other information. The PIN or other requested information is sent to the enterprise server.

A token generator associated with the user downloaded on the enterprise device generates a one-time code. If the token generator was previously removed, the device downloads the token generator associated with the user from the enterprise server. The token generator is configured to generate different codes depending upon the time stamp.

To generate such a one-time code, the token generator uses a shared secret key that was encrypted and embedded on the device during the installation process, in addition to a time stamp. Various pieces of information or data may be used to decrypt the shared secret key. For example, in some embodiments, the user's PIN may be used to decrypt the shared secret key. In some embodiments, the decrypted shared secret key and a time stamp are provided to the token generator and the one-time code is generated. The one-time code and time stamp are sent to the server.

The server may then validate the user with the various pieces of information. For example, the server may validate the user's PIN or other identifier, the device configuration and the one-time code. The server may also perform checks to determine if the secure browser is enabled. To validate the one-time code, the server may match the one-time code with the token generator serial number associated with the user. The one-time code, time stamp, and token generator serial number are sent from the server to the third party where third party validation of the one-time code is requested. Using the time-stamp of the one-time code, and the token generator serial number, the third party server validates the one-time code. If the server verifies the user to a certain level, the user may be authenticated, which information is provided to validator 345.

Accordingly, using quick-logon, the user is asked to provide a PIN (or other information), and the user may be authenticated.

PKI certificate module 335 can be configured to receive a user PIN or other identifying information in response to a request from authentication request module 325 and authenticate the user with a PKI certificate associated with the user. Thus, the process of authenticating the user may be similar to the quick-logon process described above with the PKI certificate replacing (or used in combination with) the token and token generator. For example, the user may provide the PIN or other identifying information to the enterprise device, the user device may provide the PKI certificate to the enterprise device or to a third party to verify the user's PIN (or other identifier) and PKI certificate. In some embodiments, the enterprise device or system verifies the user. In other embodiments, the user's PKI certificate or PIN (or other identifier) is provided to a third party, either directly by the user device or by the enterprise device to a third party for verification.

Comparer 340 is configured to compare information provided by the user in response to the authentication request. For example, if the user is authenticated by speaking a particular code word, both by the word and by the user's voice, comparer 340 compares the user's voice and code word to ensure there is a match with the stored voice and code word.

Validator 345 is configured to validate the user when comparer 340 compares information provided by the user or when the quick-logon process has been completed. Validator 345 may indicate to logon module 350 that the user has been authenticated and the user may now be logged on. Logon module 350 is configured to log the user onto the enterprise device after receiving information that the user has been validated by validator 345.

GUI generation module 355 can generate one or more GUI screens that allow for interaction with a user. In at least one embodiment, GUI generation module 355 generates a graphical user interface allowing a user to enter a PIN, password, or other identifier, or request other information. GUI generation module 355 may also generate a graphical user interface allowing the user to set preferences, present reports, review notification, and/or otherwise receive or convey information to the user.

Figure 4:
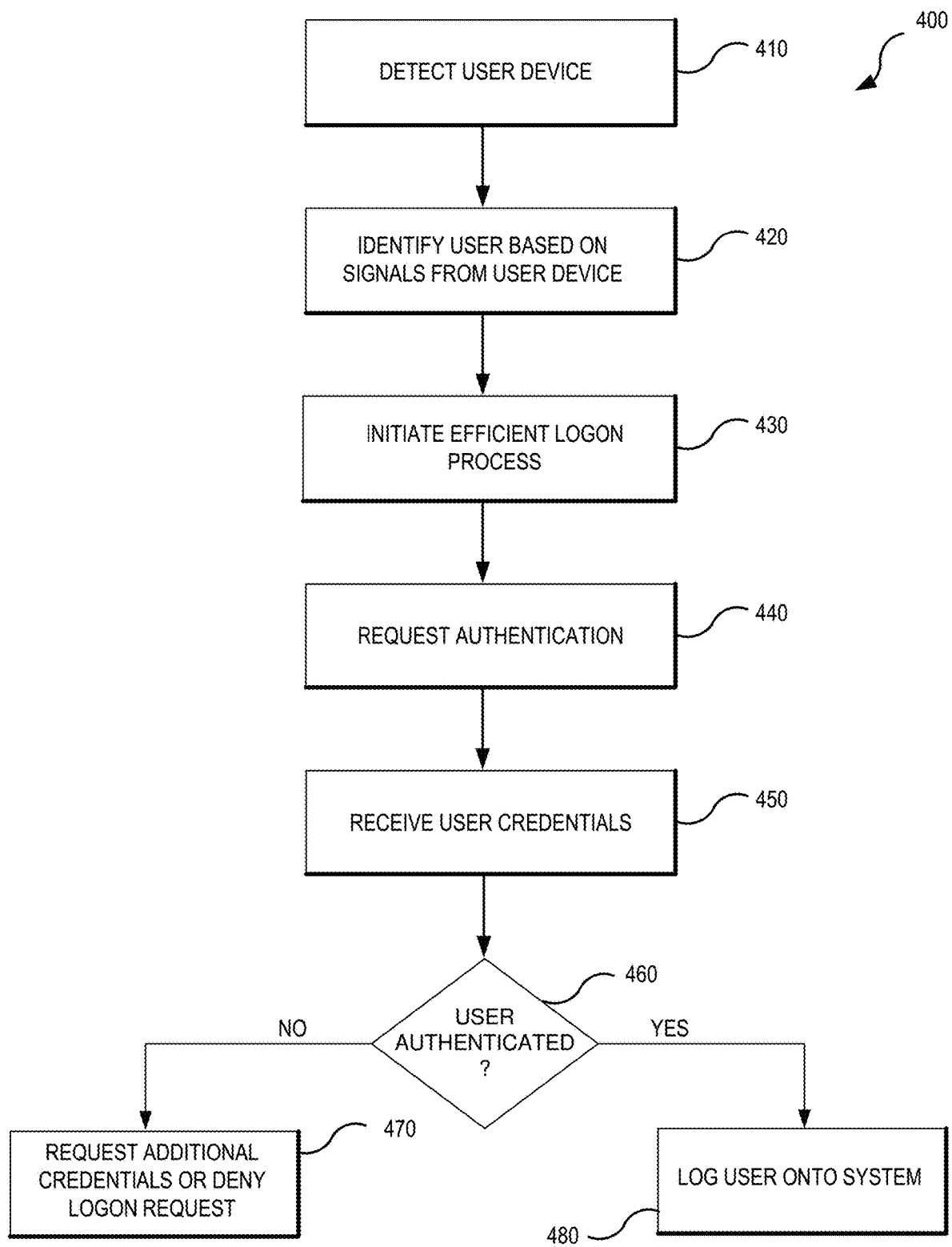
FIG. 4 is a flowchart illustrating a set of operations for efficiently logging a user onto a system in accordance with various embodiments of the present disclosure.

FIG. 4 is a flowchart illustrating a set of operations for efficiently logging a user onto an enterprise system in accordance with various embodiments of the present disclosure. The operations can be performed by various components such as one or more processors 310, detector 315, user profile module 320, authentication request module 325, quick-logon module 330, PKI certificate module 335, comparer 340, validator 345, logon module 350, graphical user interface (GUI) generation module 355, employee database 130, enterprise devices 210A-N, user device 205, and/or other components.

During detection operation 410, the user device may be detected by an enterprise device using, for example, short range communications. More than one user device may be detected. A list of the user devices detected may be displayed. One of the user devices may be selected. Identification operation 420 can identify the user based on communications or signals sent from the user device to the enterprise device. Using initiating operation 420, a user profile may be accessed based on the identification, which may indicate the level of authentication or the type of process used to log the user on. During requesting operation 440, the enterprise device may request additional authentication information. For example, the enterprise device may request a voice command, word, or PIN. In some embodiments, a PIN or other identifier may be used in connection with the quick-logon process described above or with the PKI certification process.

During receiving operation 450, the user's credentials are received. In authentication operation 460, the user is authenticated and logged on in logon operation 480 if the user provided sufficient credentials. In authentication operation 460, the user is not logged on in reject operation 470 if the user did not provide adequate authentication information. In rejection operation 470, the user may be asked to provide additional information or the user may be prevented from logon.

Figure 5:
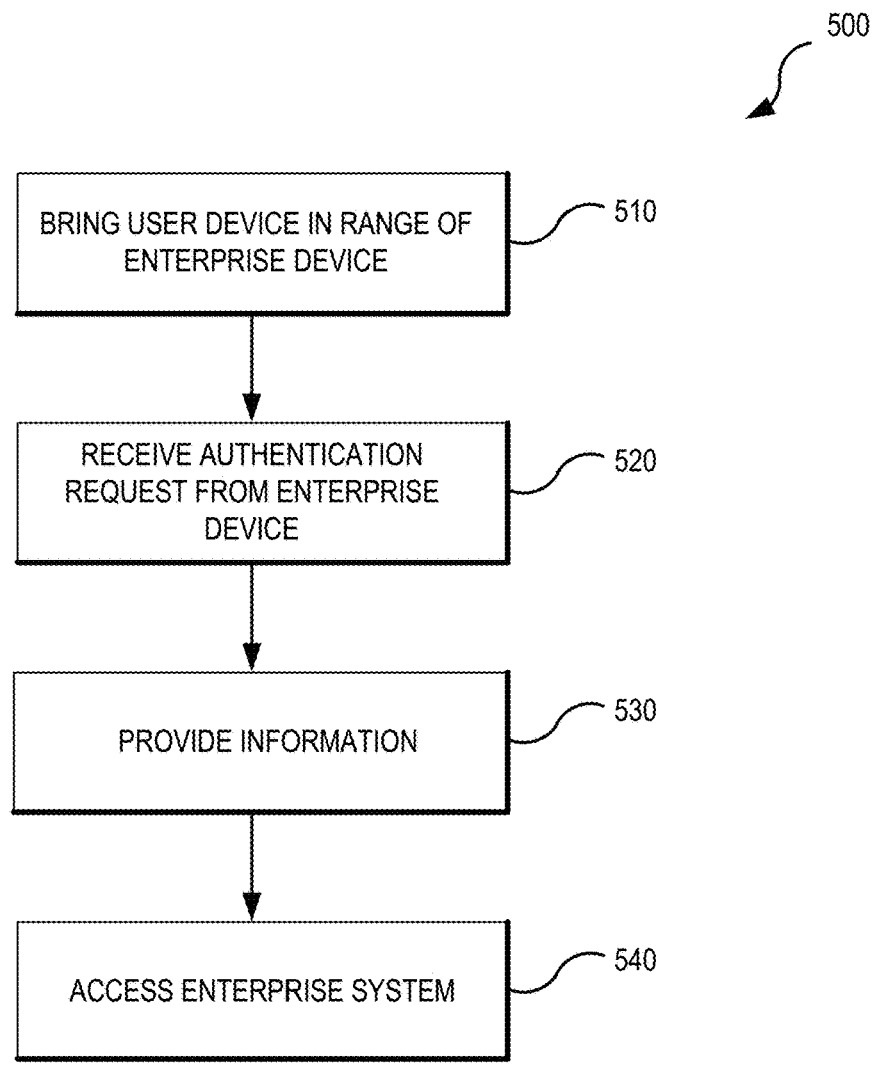
FIG. 5 is a flowchart illustrating a set of operations for efficiently logging a user onto a system in accordance with various embodiments of the present disclosure.

FIG. 5 is a flowchart illustrating a set of operations for efficiently logging a user onto an enterprise system in accordance with various embodiments of the present disclosure. The operations can be performed by various components such as one or more processors 310, detector 315, user profile module 320, authentication request module 325, quick-logon module 330, PKI certificate module 335, comparer 340, validator 345, logon module 350, graphical user interface (GUI) generation module 355, employee database 130, enterprise devices 210A-N, user device 205, and/or other components.

In range operation 510, a user may bring a user device such as a mobile device or an identification card into the range of detection of an enterprise device. In authentication operation 520, the user may be asked to provide information such as a PIN or password. After the user provides the information in providing operation 530, the user may be logged in and granted access to the enterprise system in accessing operation 540. In some embodiments, the user device will provide information to validate itself, such as a digital certificate and/or a token.

In some embodiments, the enterprise device may detect that the user is outside the detectable range of the enterprise device. After a period of time, such as over a minute, the enterprise device may automatically lock the user's computer. This action may be based upon the time of day or the date. For example, in some embodiments, if it is outside of work hours, the enterprise device may automatically logoff the user after a predetermined period of time of the user being outside of the range of the enterprise device. In some embodiments, the enterprise device may automatically download updates and restart the computer depending on the date.

Computer System Overview

Figure 6:
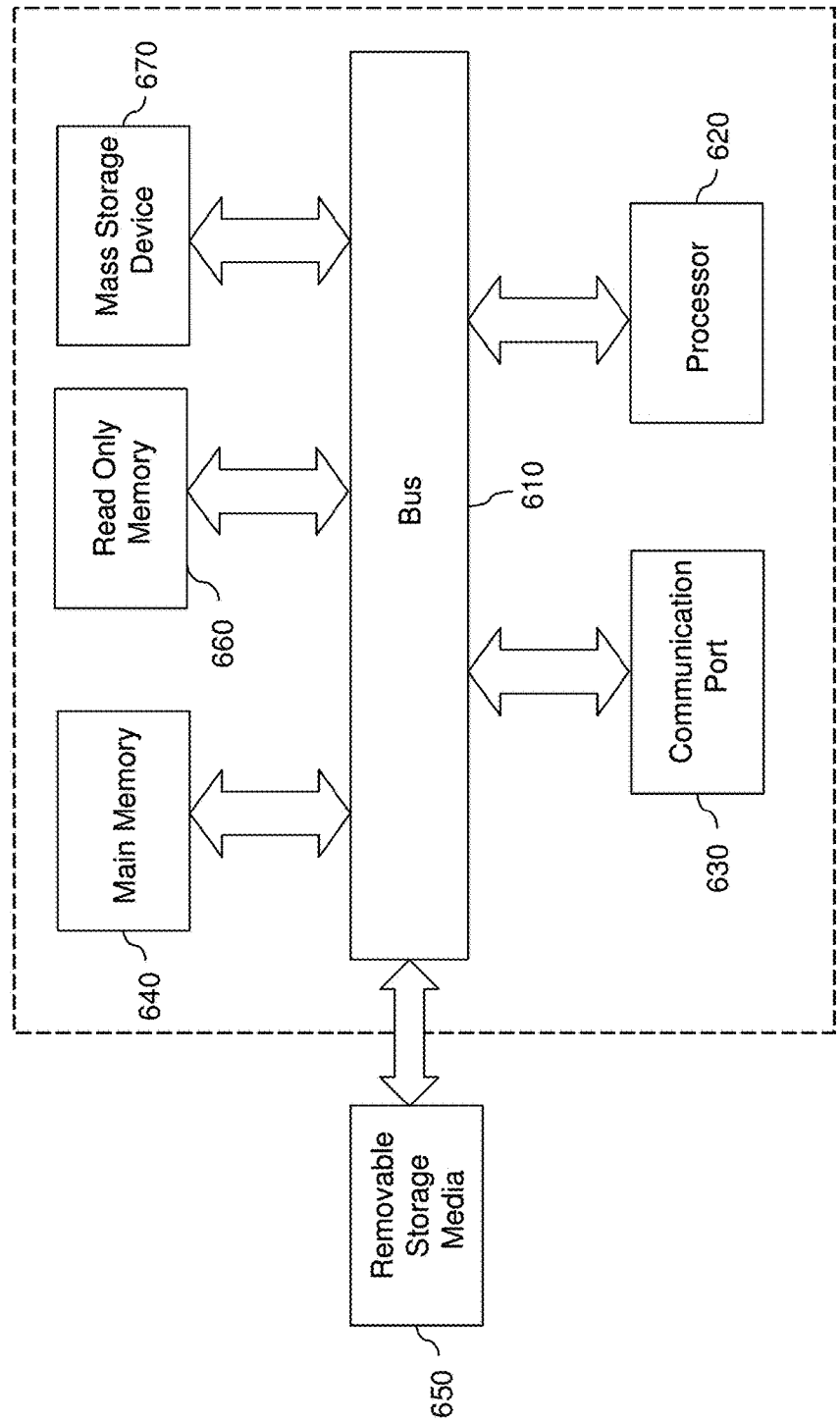
FIG. 6 illustrates an example of a computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 6 is an example of a computer system 600 with which embodiments of the present disclosure may be utilized. According to the present example, the computer system includes a bus 610, at least one processor 620, at least one communication port 630, a main memory 640, a removable storage media 650, a read only memory 660, and a mass storage 670.

Processor(s) 620 can be any known processor, such as, but not limited to, an Intel® Itanium® or Itanium 2® processor(s); AMD® Opteron® or Athlon MP® processor(s); or Motorola® lines of processors. Communication port(s) 630 can be any of an RS-232 port for use with a modem-based dialup connection, a 10/100 Ethernet port, or a Gigabit port using copper or fiber. Communication port(s) 630 may be chosen depending on a network such as a Local Area Network (LAN), Wide Area Network (WAN), or any network to which the computer system 600 connects.

Main memory 640 can be Random Access Memory (RAM) or any other dynamic storage device(s) commonly known in the art. Read only memory 660 can be any static storage device(s) such as Programmable Read Only Memory (PROM) chips for storing static information such as instructions for processor 620.

Mass storage 670 can be used to store information and instructions. For example, hard disks such as the Adaptec® family of SCSI drives, an optical disc, an array of disks such as RAID, such as the Adaptec® family of RAID drives, or any other mass storage devices may be used.

Bus 610 communicatively couples processor(s) 620 with the other memory, storage and communication blocks. Bus 610 can be a PCI/PCI-X or SCSI based system bus depending on the storage devices used.

Removable storage media 650 can be any kind of external hard-drives, floppy drives, IOMEGA® Zip Drives, Compact Disc—Read Only Memory (CD-ROM), Compact Disc—Re-Writable (CD-RW), and/or Digital Video Disk—Read Only Memory (DVD-ROM).

The components described above are meant to exemplify some types of possibilities. In no way should the aforementioned examples limit the scope of the disclosure, as they are only examples.

In conclusion, embodiments of the present disclosure provide novel systems, methods and arrangements for efficient logon. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features.

What is claimed is:

1. A method comprising:
   detecting a first device associated with a user within a detectable range of a second device;
   requesting authentication information based on an authentication challenge indicated in a user profile associated with the first device;
   receiving the authentication information;
   in response to receiving the authentication information, installing a token generator on the second device;
   generating, by the token generator associated with the user, a secure token, wherein the token generator is stored on the second device;
   sending, to a server, the secure token and a time stamp associated with the secure token; and
   granting, to the user, access to one or more services in response to receiving a verification of the secure token.

2. The method of claim 1, wherein an indication that the first device is within the detectable range is received using at least one of near-field communications, radio frequency identification, or a short-range communication protocol.

3. The method of claim 1, wherein the secure token is a one-time token.

4. The method of claim 1, wherein the user profile further indicates access levels, wherein the authentication challenge is defined at least in part by the access levels.

5. The method of claim 1, wherein the authentication information includes:
   authentication information associated with the user and received from the user; and
   authentication information associated with the first device and received from the first device.

6. The method of claim 1, wherein the authentication information is received using one or more of a microphone, fingerprint scanner, camera, video camera, touch surface, keyboard, or motion sensor, wherein the authentication information includes at least one of biometric data, a password, a public key certification, or a personal identification number.

7. The method of claim 1, wherein the first device is enabled with short-range communication capabilities, wherein the first device is one of an identification card, tablet computer, personal device monitor, or mobile device, wherein the second device is one of an automated transaction machine ("ATM"), tablet computer, desktop computer, mobile device, or laptop computer.

8. The method of claim 1, wherein the method further comprises:
   detecting that the first device is no longer within the detectable range of the second device; and
   in response to detecting that the first device is no longer within the detectable range of the second device, taking an action,
      wherein the action is one of logging the user off of the second device, locking the second device, or shutting down the second device.

9. The method of claim 1, wherein the authentication information is used to verify the secure token.

10. The method of claim 1, wherein the method further comprises:
    submitting, to a third party, the secure token; and
    receiving, from the third party, verification of the secure token.

11. A non-transitory computer-readable storage medium containing a set of instructions that, when executed by one or more processors, cause a machine to:
    detect a first device associated with a user within a detectable range of a second device;
    request authentication information based on an authentication challenge indicated in a user profile associated with the first device;
    receive the authentication information;
    in response to receiving the authentication information, install a token generator on the second device;
    generate, by the token generator associated with the user, a secure token,
       wherein the token generator is stored on the second device;
    send, to a server, the secure token and a time stamp associated with the secure token; and
    grant, to the user, access to one or more services in response to receiving a verification of the secure token.

12. The non-transitory computer-readable storage medium of claim 11, wherein the user profile further indicates access levels, wherein the authentication challenge is defined at least in part by the access levels.

13. The non-transitory computer-readable storage medium of claim 11, wherein the authentication information is used to verify the secure token.

14. The non-transitory computer-readable storage medium of claim 11, wherein the set of instructions, when executed by the one or more processors, further causes the machine to:
    submit, to a third party, the secure token; and
    receive, from the third party, verification of the secure token.

15. The non-transitory computer-readable storage medium of claim 11, wherein the set of instructions, when executed by the one or more processors, further cause the machine to:
    detect that the first device is no longer within the detectable range of the second device; and
    in response to detecting that the first device is no longer within the detectable range of the second device, take an action,
       wherein the action is one of logging the user off of the second device, locking the second device, or shutting down the second device.

16. A system comprising:
    a memory;
    a processor in communication with the memory, the processor operable to execute software modules, the software modules comprising:
       a detection module configured to:
          detect a first device associated with a user within a detectable range of a second device;
       an authentication request module configured to:
          request authentication information based on an authentication challenge indicated in a user profile associated with the first device,
          receive the authentication information,
          in response to receiving the authentication information, installing a token generator on the second device;
          generate, by the token generator associated with the user, a secure token,
             wherein the token generator is stored on the second device, send, to a server, the secure token and a time stamp associated with the secure token; and a logon module configured to:

grant, to the user, access to one or more services in response to receiving a verification of the secure token.

17. The system of claim 16, wherein the secure token is a one-time token.

18. The system of claim 16, wherein the authentication information is used to verify the secure token.

* * * * *